Jan. 10, 1956 J. L. WHEELER 2,730,614

AUTOMATIC FREQUENCY CONTROL SYSTEM

Filed Jan. 20, 1950 3 Sheets-Sheet 1

INVENTOR.
John L. Wheeler

BY J. L. Bowes
Atty

INVENTOR.
John L. Wheeler
BY T. L. Bowes
Att'y

INVENTOR.
John L. Wheeler
BY J. L. Bowes
Att'y

United States Patent Office 2,730,614
Patented Jan. 10, 1956

2,730,614

AUTOMATIC FREQUENCY CONTROL SYSTEM

John L. Wheeler, Rochester, N. Y., assignor to Stromberg-Carlson Company, a corporation of New York Application January 20, 1950, Serial No. 139,773

8 Claims. (Cl. 250—20)

The present invention relates to an automatic frequency control system and more particularly to an improved automatic frequency control system for accurately maintaining the center frequency of a frequency modulated signal midway between the two extreme frequencies of the frequency swing.

It is a common practice in frequency modulated systems to regulate the frequency sensitive element of the system to maintain, for example, the intermediate frequency of a superheterodyne receiver at a predetermined value regardless of frequency shifts and the like. One way to accomplish this is to take the average output from a frequency sensitive detector and feed this output back into the frequency controlling element of the system. Thus, if the center frequency of the system varies, it tends to be returned to some fixed frequency determined by the system.

With arrangements employed heretofore, optimum use of the bandwidth of the systems is not accomplished. For example, the frequency modulated signal may vary between two extremes of duty cycle where in each case the average of the frequency deviations is not midway between the frequency extremes. The total bandwidth necessary to receive several different signals of this type for different duty cycles is greater than that required for any one of the signals alone. As the duty cycle changes, the maximum shift on each side of center frequency varies even though the over-all peak to peak value of the frequency shift may remain constant. It would be desirable to provide an automatic frequency control system wherein the bandwidth required particularly of the intermediate frequency stage to pass frequency modulated signals of varying duty cycles is greatly reduced.

Accordingly, it is an object of the present invention to provide an automatic frequency control system whereby a much more efficient use of the bandwidths of the system is accomplished.

It is another object of the present invention to provide a new and improved automatic frequency control arrangement wherein the center frequency tends to remain midway between the two extremes of frequency whereby large changes in duty cycle may be accommodated with narrower bandwidths in the respective stages such as the intermediate frequency stage, for example.

It is a further object of the present invention to provide an automatic frequency control system particularly well adapted for use in connection with pulse length modulation, microwave radio telephone links.

Further objects and advantages of the present invention will become apparent as the following description proceeds and the features of novelty which characterize the invention will be pointed out with particularity in the claims annexed to and forming a part of this specification.

Figure 1:
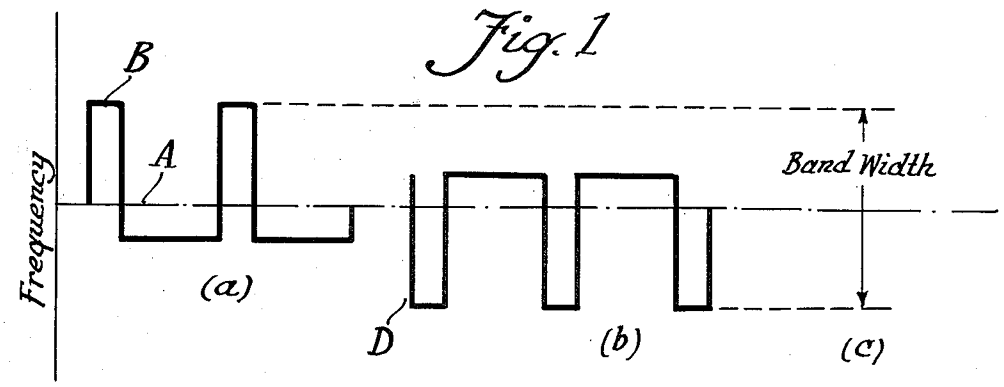
Figure 5:
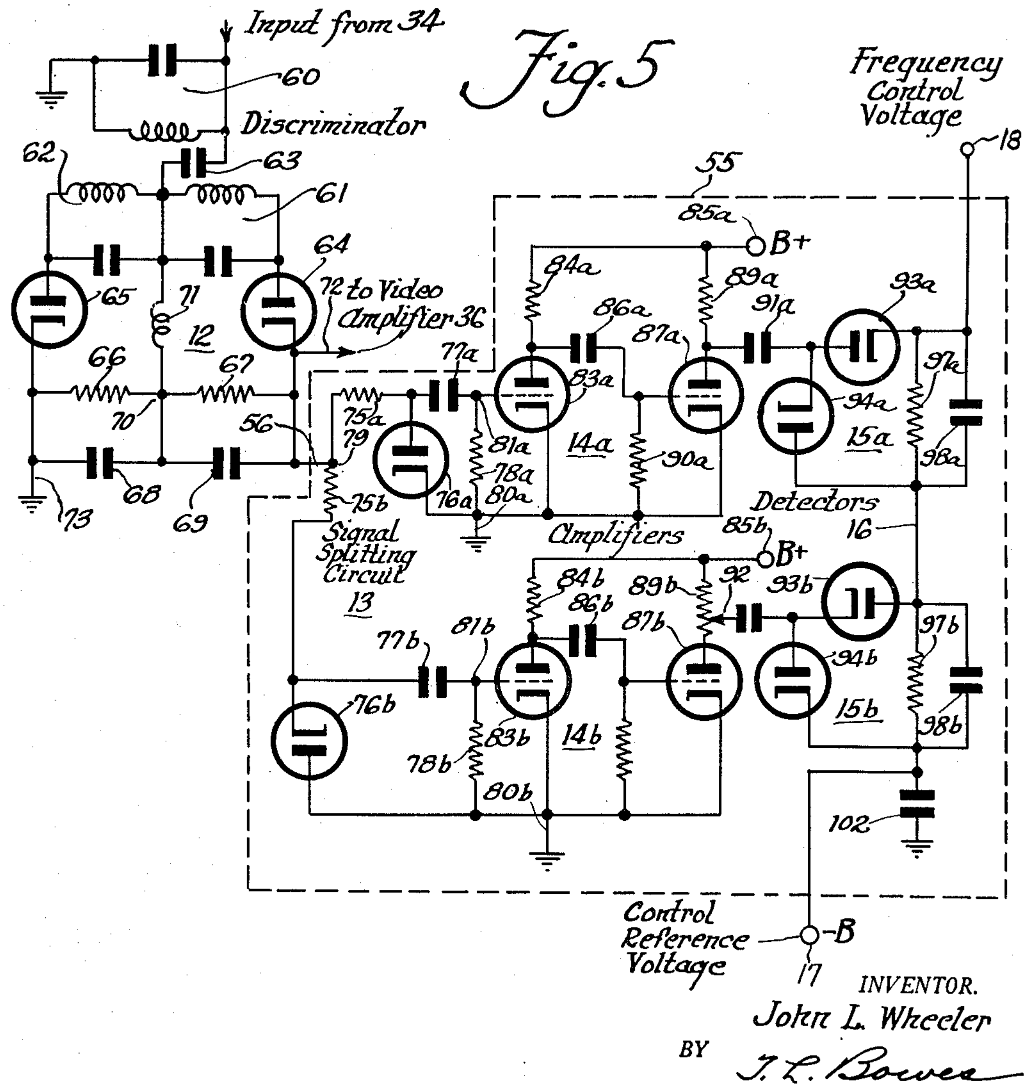
Figure 2:
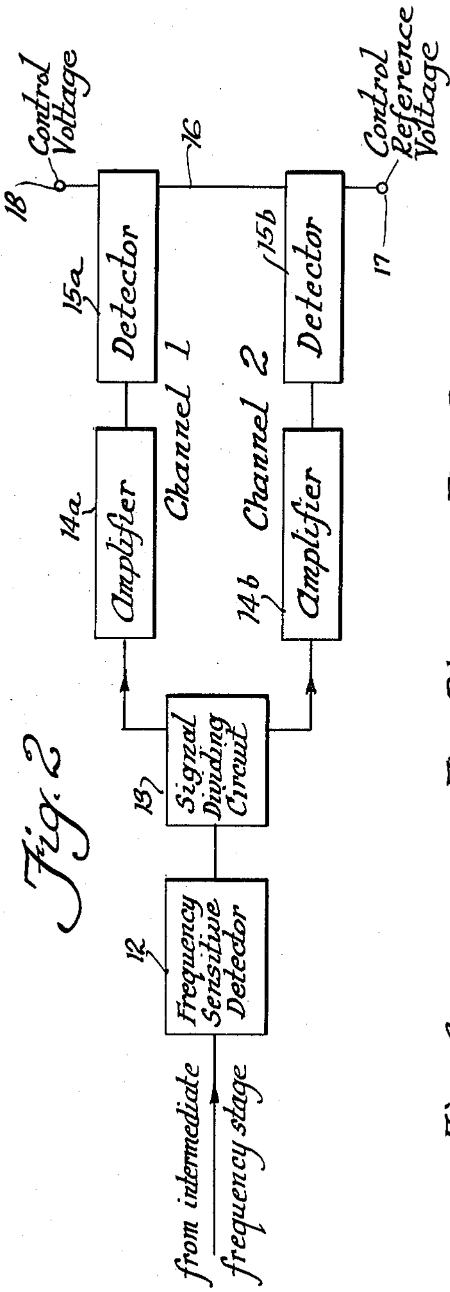
Figure 4:
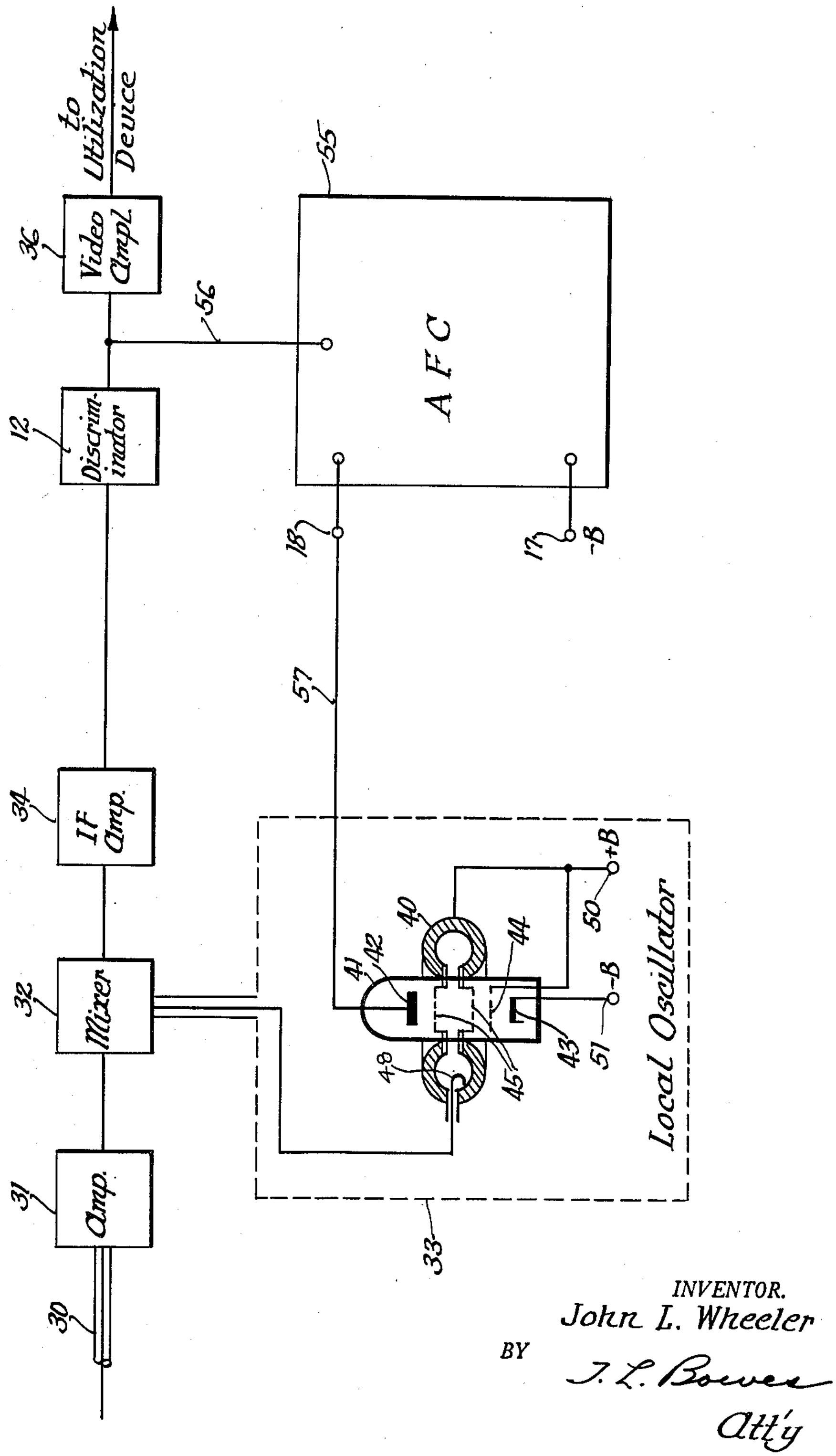

For a better understanding of the present invention, reference may be had to the accompanying drawings in which Fig. 1 comprises curve diagrams to aid in understanding the present invention;

Fig. 2 is a block diagram showing the basic principles of the present invention;

Figs. 3*a*, 3*b*, 3*c* and 3*d* are curve diagrams further to aid in understanding the present invention;

Fig. 4 is a block diagram illustrating an application of the present invention; and Fig. 5 is a schematic circuit diagram illustrating one embodiment of the present invention showing details of the circuit involved.

The present invention is concerned with an arrangement in which the output from a frequency sensitive detector is split into two parts, one part more positive than the voltage corresponding to the required center frequency of the detector and the other part more negative than the voltage corresponding to this required center frequency. Any direct current component of the signal to be separated is eliminated. The two separated signal portions are sent through separate channels where they are amplified and detected and the direct current outputs of the detectors which are of opposite polarity are combined as by being connected in series. The resultant control voltage is applied to a control reference voltage to produce a final control voltage comprising the reference voltage modified by the resultant control voltage which is applied to the frequency controlling element of the system. With this arrangement the center frequency of the frequency modulated signal tends to remain mid-way between the two extreme frequencies rather than becoming the average frequency as in prior art arrangements, with the result that large changes in duty cycle may be accommodated using a narrower bandwidth.

For a better understanding of the present invention reference may be had to Fig. 1 of the drawings wherein there is disclosed a graph divided into parts (*a*), (*b*) and (*c*) in which the ordinates represent a signal frequency variable with respect to a center frequency designated as A. Although the average of the frequency variations for a duty cycle represented by the curve B of Fig. 1 is the center frequency A, this center frequency is clearly not mid-way between the frequency extremes. This is similarly true of curve D which represents another duty cycle. For the purpose of passing without distortion signals of each duty cycle represented by curves B and D, it is necessary to provide a device having a bandwidth clearly represented by part (*c*) of Fig. 1, which is much wider than would be required to pass signals represented by either of the curves B or D alone. Accordingly, the present invention is primarily concerned with an automatic frequency control arrangement whereby the center frequency A may be disposed mid-way between the two frequency extremes rather than as shown in Fig. 1 of the drawings, whereby a much more efficient use of the bandwidth is made and the intermediate frequency pass band will pass the signal without distortion.

Figures 3A, 3B, 3C, 3D:
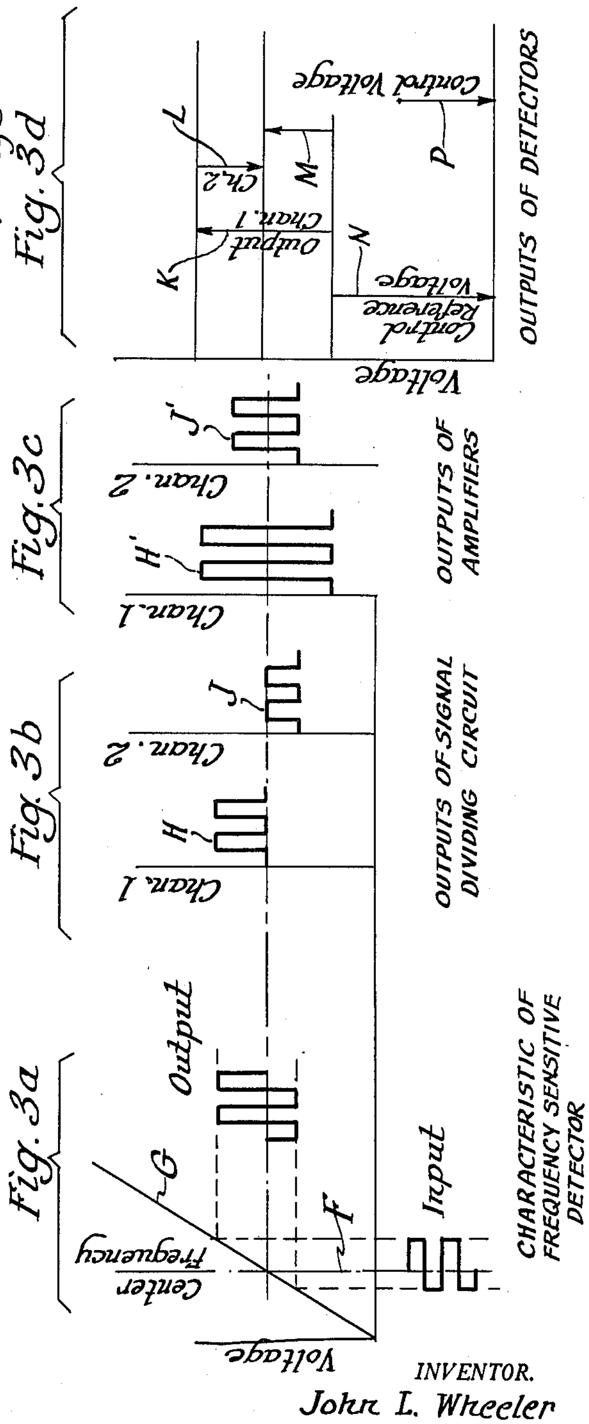

It will be understood that receivers for frequency modulated signals, conventionally employ a frequency sensitive detector commonly called a discriminator which has a characteristic represented by the curve G of Fig. 3*a* of the drawings. The output voltage of such a discriminator represented by points along the curve G may be positive or negative and the magnitude thereof is variable. If the output is zero, then the signal is on center frequency represented by the curve F of Fig. 3*a* of the drawings.

Referring now to Fig. 2 of the drawings, the broad principles of the present invention may readily be understood by considering the frequency modulated signal of the system as being detected by a frequency sensitive detector generally referred to as a discriminator and designated by the reference numeral 12. In accordance with the present invention, the output of such a frequency sensitive detector is supplied to a signal dividing circuit generally designated at 13 which eliminates any direct current component and splits the modulation signal into two parts; one part more positive than the voltage corresponding to the center frequency F of Fig. 3*a* being supplied to Channel 1, and one part more negative than the center frequency F being supplied to Channel 2. Each of these channels is substantially identical and accordingly only one of the channels is described, the same reference numerals marked with an appropriate subscript *a* or *b* being used for identical parts. Channel 1 comprises an amplifier **14*a* and a detector 15*a* while Channel 2 comprises an amplifier 14*b* and a detector 15*b*. The amplifiers 14*a* and 14*b* merely increase the signal strength of the divided signals supplied to the respective Channels 1 and 2. The detectors 15*a* and 15*b*, however, provide direct current output voltages proportional to the peak to peak voltage delivered by the corresponding amplifier in the same channel. These direct current output voltages are arranged to be of opposite polarities and are added in series by virtue of an electrical connection 16 therebetween. The series arranged voltages are furthermore superimposed on a reference voltage applied to the terminal 17 with a result that there appears at the terminal 18** a control voltage which, when applied to the frequency controlling element of a system, will tend to provide automatic frequency control in an improved manner. This arrangement broadly embodying the principles of the present invention insures that the center frequency tends to remain mid-way between the two extreme frequencies rather than becoming the average frequency. As a result, large changes in duty cycle may be accommodated using a narrower bandwidth in the intermediate frequency stage.

The operation of the broad principles of the present invention disclosed in Fig. 2 of the drawings may best be understood by reference to Figs. 3*a* to 3*d* of the drawings. Fig. 3*a* shows the characteristics of the frequency sensitive detector 12 indicating that as the frequency varies either above or below the center frequency F, that a variable magnitude voltage is obtained at the output of the device 12 which may be either positive or negative depending upon both the direction and the magnitude of the frequency deviation from the center frequency F. By means of the signal dividing circuit 13 of the present invention any direct current component of the modulation component is eliminated and the positive portion of the output of detector 12 is transmitted through Channel 1. This portion is represented by the curve H of Fig. 3*b*. The negative portion of the output of the frequency sensitive detector 12 is transmitted through Channel 2 and a typical signal in this channel is represented by the curve J in Fig. 3*b* of the drawings. The signal portions represented by the curves H and J respectively are amplified by the respective amplifiers **14*a* and 14*b*** so as to produce the outputs presented by the curves H' and J' shown in Fig. 3*c* of the drawings. These signals are supplied to their respective detectors **15*a* and 15*b* so as to produce direct current outputs of opposite polarities. The direct current output of Channel 1 is represented by the arrow K indicating a positive polarity. The direct current output of Channel 2 on the other hand is represented by the arrow L of different magnitude and opposite polarity. The resultant of K and L is represented by the arrow M which is superimposed on the reference control voltage represented by the vector N producing the resultant control voltage P for the particular instant under consideration. It will be apparent that the reference control voltage represented by N may be increased or decreased in dependance upon the resultant output from the detectors 15*a* and 15*b*** to produce the variable resultant control voltage P.

It will be understood that the present invention has numerous applications to apparatus where automatic frequency control is desirable. It has been found to be unusually well suited for controlling frequency shift in pulse length modulation, microwave radio telephone links. In such a system the frequency shifts between the two fixed frequencies and the amount of time spent at each frequency is a measure of the modulation. As the pulse length is changed, the duty cycle varies. Such a system should be capable of transmitting direct current modulation. In such a system it is generally important that there be provided automatic frequency control in the receiver and usually the local oscillator of such a receiver has its frequency adjusted so that the signal at the output of the mixer stage remains within the bandwidth of the intermediate frequency amplifier stage.

A representative application of the present invention is illustrated in Fig. 4 of the drawings where a receiver for the above mentioned purpose is illustrated in block diagram. As illustrated, the microwave input signal is supplied by a coaxial cable, generally designated at 30, to a suitable amplifier 31 which in return is connected to a mixer 32 having associated therewith a local oscillator 33. The signals applied to the mixer 32 from both the local oscillator 33 and the amplifier 31 result in an intermediate frequency signal which is supplied in succession to an intermediate frequency amplifier 34, the frequency sensitive detector or discriminator 12 and a video amplifier 36, the output of which might be connected to a suitable utilization device which might be a signal reproducer or in the case of a microwave radio telephone link, another transmitter.

The local oscillator 33 has been specifically illustrated as of the type employing a klystron tube connected as a reflex klystron. As schematically illustrated, this reflex klystron circuit comprises a resonant cavity 40 associated with an electron discharge valve 41 comprising a repeller plate 42, a cathode 43, an accelerating grid 44 and grids 45 comprising the buncher and catcher grids. The local oscillator 33 is connected to the mixer 32 by means of a one turn coupling loop 48 which couples energy out of the resonant cavity 40. A source of +B potential 50 is supplied respectively to the accelerating grid 44 and the resonant cavity 40. The cathode 43, on the other hand, is connected to a terminal 51 of a −B potential source. A suitable negative voltage is applied to the repeller plate and by proper adjustment of this negative voltage, the electrons which have passed the bunching field may be made to pass through the resonator again at the proper time to deliver energy to the coupling loop 48. Thus, the feedback needed to produce oscillations is obtained. Spent electrons are removed from the tube 41 by the grids 45 of the resonator or by the positive accelerating grid 44. By changing the negative potential of the repeller plate 42, the operating frequency of the local oscillator 33 can be varied over a small range since this potential determines the transit time of the electrons between this first and second passages through the resonator.

In accordance with the present invention, there is provided an automatic frequency control circuit of the present invention generally designated at 55 which is connected as by the conductor 56 to the output of the discriminator 12. As will become apparent from the following description, the automatic frequency control circuit varies the negative potential at its terminal 18 applied to the repeller plate 42 of the reflex klystron of the local oscillator 33 thereby varying the frequency output of the local oscillator. To this end the repeller plate 42 is connected by a conductor 57 to the terminal 18. The control reference voltage is applied at the terminal 17 and is indicated as −B potential. As will become apparent from the description included hereinafter, the automatic frequency control circuit 55 tends to superimpose on the −B control reference voltage, a component which may be either negative or positive depending upon the direction of the frequency shift from the center frequency whereby the frequency output of the local oscillator is varied in the proper direction to tend to restore the frequency of the intermediate frequency stage 34 so as to be symmetrical about a center frequency.

Referring now to Fig. 5 of the drawings, the automatic frequency control circuit of the present invention is designated by the same reference numeral 55 as in Fig. 4 of the drawings. Furthermore, in order to aid in understanding the present invention the details of the discriminator 12 are also shown. This discriminator 12 corresponds with the device of the same reference numeral in Figs. 2 and 4 of the drawings. The corresponding parts of Fig. 5 are furthermore designated by the same reference numerals as in Fig. 2. As illustrated, the signal from the intermediate frequency amplifier 34 is supplied to the discriminator 12 shown in detail in Fig. 5 of the drawings. It should be understood that the discriminator 12 may comprise any of the well known discriminators and, as illustrated, includes a tuned input circuit 60 inductively coupled with tuned circuits 61 and 62 respectively. A suitable capacitor 63 capacitively couples the tune circuits 60, 61 and 62 in addition to the inductance coupling already mentioned. The discriminator 12 further includes diodes 64 and 65 having their plates connected respectively to the tuned circuits 61 and 62. The cathodes of the diodes 64 and 65 are each connected to one end of a pair of serially connected resistors 66 and 67. As illustrated, each of the resistors 66 and 67 is paralleled by a capacitor designated as 68 and 69 respectively. The common terminal 70 of the resistors 66 and 67 are connected by an inductance 71 with the terminal of capacitor 63 connected to the tuned circuits 61 and 62.

The operation of the discriminator 12 will be well understood by those skilled in the art, having a characteristic similar to the curve G of Fig. 3*a* of the drawings. The resultant voltage across the resistors 66 and 67 comprises the modulation component and will have a varying polarity in dependance upon whether the frequency is above or below the center frequency. The output of the discriminator at its output terminal 72 is effectively the resultant potential across the serially arranged resistors 66 and 67 with respect to ground 73. It will be noted that the terminal 72 is connected to the video amplifier 36 or the like shown in Fig. 4 of the drawings.

Considering now the automatic frequency control circuit 55, as shown in somewhat greater detail in Fig. 5 of the drawings, there is illustrated the signal splitting circuit 13 comprising a pair of resistors **75*a* and 75*b*, a pair of diodes 76*a* and 76*b*, a pair of blocking condensers 77*a* and 77*b* and a pair of output resistors 78*a* and 78*b*. As illustrated, the output terminal 72 of the discriminator 12 is connected to the common terminal 79 of the resistors 75*a* and 75*b*. The other terminal of resistor 75*a* is connected to the plate of the diode 76*a* while the other terminal of the resistor 75*b* is connected to the cathode of the diode 76*b*. The cathode of diode 76*a* is grounded as indicated at 80*a* while the anode of diode 76*b* is grounded as indicated at 80*b*. The blocking condenser 77*a* and resistor 78*a* are serially connected across the diode 76*a* while similarly the blocking condenser 77*b* and resistor 78*b* are serially connected across the diode 76*b*. The ungrounded terminals 81*a* and 81*b* of the resistors 78*a* and 78*b* respectively represent the output terminals of the signal dividing circuit 13. Any voltage more positive than a voltage representative of the center frequency appears at terminal 81*a* while conversely any voltage more negative than a voltage representative of the center frequency voltage appears at terminal 81*b*. The blocking condensers 77*a* and 77*b* eliminate any direct current component from the outputs of the signal dividing circuit 13. The outputs of the signal dividing circuits are connected to the amplifiers 14*a* and 14*b***.

These amplifiers **14*a* and 14*b* may comprise any suitable type of amplifiers and are specifically illustrated as two stage amplifiers. Since the amplifier 14*a* is identical with the amplifier 14*b***, only the former will be described and the corresponding parts of the latter will be designated by the same reference numerals marked with the subscript *b* instead of the subscript *a*. As illustrated, the amplifier **14*a* comprises a first stage including a triode 83*a* having its plate circuit connected through a current limiting resistor 84*a* with a source of +B potential 85*a*. The control electrode of the triode 83*a* is connected to the output terminal 81*a* of the signal dividing circuit 13. The output from the amplifier 14*a* comprising the triode 83*a* is coupled by a suitable coupling capacitor 86*a* with a second stage of amplification including the triode 87*a*. The plate circuit of the tube 87*a* is connected to the source of +B potential 85*a* through a current limiting resistor 89*a*. A suitable self-biasing resistor 90*a* is connected between the grid and cathode of the triode 87*a*. The amplified signal at the output of the second stage of the amplifier 14*a* is coupled by a suitable coupling capacitor 91*a* with the detector 15*a***.

As illustrated, the detector **15*a* comprises a pair of diodes 93*a* and 94*a* arranged as a full wave rectifier with the input connected to the coupling capacitor 91*a*. The diode 93*a* has its anode connected to one terminal of the coupling capacitor 91*a* while the diode 94*a* has its cathode connected to this terminal. The other terminals of the diodes 93*a* and 94*a* are connected to opposite ends of an output resistor 97*a* across which appears a direct current voltage proportional to the peak to peak voltage of the output signal from the amplifier 14*a***.

Similarly there appears across the resistor **97*b* of detector 15*b*, an output voltage of opposite polarity to that across resistor 97*a* which is also a direct current voltage proportional to the peak to peak voltage delivered by the amplifier 14*b*. Preferably, each of the resistors 97*a* and 97*b* are paralleled by suitable high frequency by-pass condensers 98*a* and 98*b* respectively. The respective voltages across the resistors 97*a* and 97*b* are added together by connecting the resistors in series by means of the conductor 16 and the control voltage across the serially arranged resistors is furthermore added to a control reference voltage represented by the terminal 17, whereby there appears at the output terminal 18 a total control voltage which is applied to the repeller electrode 42 of the klystron local oscillator 33 in the manner mentioned above. The voltage appearing at the terminal 18 will deviate slightly from the fixed control reference voltage at terminal 17 and cause the desired change in frequency at the local oscillator 33. Preferably, a suitable by-pass capacitor 102 is connected to the terminal 17** to prevent any high frequency surges from reaching the reference voltage source.

In order to make the gains in Channels 1 and 2 equal, the resistor **89*b* in Channel 2 is arranged as a potentiometer with a tap 92**.

In view of the detailed description included above, the operation of the automatic frequency control circuit of the present invention will be understood by those skilled in the art. Briefly, however, with the automatic frequency control unit 55 applied to a receiver as shown in Fig. 4 of the drawings, the modulation signals appearing at the output of the discriminator 12, are split and sent through two separate channels designated as Channel 1 and Channel 2 in Fig. 2 of the drawings. Any direct current component is removed so that a control voltage representative of the frequency deviation from a frequency mid-way between the frequency peaks is obtained which when properly applied to the local oscillator of the receiver tends to restore the intermediate frequency of the receiver to the center frequency of the signal. Thus, a much more efficient use of the bandwidth is obtained than would be the case if merely the voltage output from the frequency sensitive detector or discriminator 12 were fed back to the local oscillator.

While there has been described and illustrated a particular embodiment of the present invention, it will be obvious to those skilled in the art that various changes and modifications may be made therein without departing from the invention in its broader aspects and it is, therefore, aimed in the appended claims to cover all such changes and modifications as fall within the true spirit and scope of the present invention.

What is claimed as new and desired to be secured by Letters Patent of the United States is:

1. An automatic frequency control arrangement for maintaining the center frequency of a system including a frequency controlling element and a frequency sensitive element substantially mid-way between the two extremes of frequency deviation, comprising, a signal dividing circuit operative to separate into two distinct channels the signals appearing at the output of said frequency sensitive element into a portion more positive than the voltage corresponding to the center frequency of said frequency sensitive element and a portion more negative than said voltage, means for separately amplifying the signal portions in each of said channels, means for detecting the amplified signal portions in each of said channels, and means controlled at least in part by the resultant of the detected signal portions for varying the frequency of said frequency controlling element.

2. An automatic frequency control arrangement for maintaining the center frequency of a system including a frequency controlling element and a frequency sensitive element substantially mid-way between the two extremes of frequency deviation, comprising, a signal dividing circuit operative to separate into two distinct channels the signals appearing at the output of said frequency sensitive element into a portion more positive than the voltage corresponding to the center frequency of said frequency sensitive element and a portion more negative than said voltage, said signal dividing circuit including means for eliminating any direct current component from the signals at the output of said frequency sensitive element, means for separately amplifying the signal portions in each of said channels, means for detecting the amplified signal portions in each of said channels, and means controlled at least in part by the resultant of the detected signal portions for varying the frequency of said frequency controlling element.

3. An automatic frequency control arrangement for maintaining the center frequency of a system including a frequency controlling element and a frequency sensitive element substantially mid-way between the two extremes of frequency deviation, comprising, a signal dividing circuit operative to separate into two distinct channels the signals appearing at the output of said frequency sensitive element into a portion more positive than the voltage corresponding to the center frequency of said frequency sensitive element and a portion more negative than said voltage, means for detecting the signal portions in each of said channels, and means controlled at least in part by the resultant of the detected signal portions for varying the frequency of said frequency controlling element.

4. For use with a receiver of the type including a frequency controlling element, an intermediate frequency stage and a frequency sensitive element; an automatic frequency control device to maintain the intermediate frequency signal within the pass band of said intermediate frequency stage, comprising a pair of independent signal channels each including a detector, a signal dividing circuit operative to divide the signals appearing at the output of said frequency sensitive element into a first signal portion more positive than the voltage corresponding to the center frequency of said frequency sensitive element and a second signal portion more negative than said voltage, means for supplying said first signal portion to said first channel, means for supplying said second signal portion to said second channel, means for recombining in phase opposition the detected signal portions from each of said channels, and means controlled at least in part by the recombined detected signal portions for varying the frequency of said frequency controlling element.

5. For use with a receiver of the type including a frequency controlling element, an intermediate frequency stage and a frequency sensitive element; an automatic frequency control device to maintain the intermediate frequency signal within the pass band of said intermediate frequency stage, comprising, a pair of independent signal channels each including a detector, a signal dividing circuit operative to divide the modulation signal appearing at the output of said frequency sensitive element into a first signal portion more positive than the voltage corresponding to the center frequency of said frequency sensitive element and a second signal portion more negative than said voltage, said signal dividing circuit including means for eliminating any direct current component of said modulation signal, means for supplying said first signal portion to said first channel, means for supplying said second signal portion to said second channel, means for recombining in phase opposition the detected signal portions from each of said channels, and means controlled in part by the recombined detected signal portions for varying the frequency of said frequency controlling element.

6. For use with a receiver of the type including a local oscillator, an intermediate frequency stage and a frequency discriminator; an automatic frequency control device to maintain the intermediate frequency signal within the pass band of said intermediate frequency stage, comprising, a pair of independent signal channels each including an amplifier and a detector, a signal dividing circuit operative to divide the signals appearing at the output of said frequency discriminator into a first signal portion more positive than the voltage corresponding to the center frequency of said frequency discriminator and a second signal portion more negative than said voltage, means for supplying said first signal portion to said first channel, means for supplying said second signal portion to said second channel, means for recombining in phase opposition the detected signal portions from each of said channels, a source of reference voltage for said local oscillator, and means at least partially responsive to the magnitude and polarity of the recombined detected signal portions for modifying the voltage from said source of reference voltage to vary the output frequency of said local oscillator.

7. For use with a receiver of the type including a frequency controlling element, an intermediate frequency stage and a frequency sensitive element; an automatic frequency control device to maintain the intermediate frequency signal within the pass band of said intermediate frequency stage, comprising, a pair of independent signal channels each including an amplifier and a detector, a signal dividing circuit operative to divide the signals appearing at the output of said frequency sensitive element into a first signal portion more positive than the voltage corresponding to the center frequency of said frequency sensitive element and a second signal portion more negative than said voltage, means for supplying said first signal portion to said first channel, means for supplying said second signal portion to said second channel, means for recombining in phase opposition the detected signal portions from each of said channels, means for making the gains in each of said channels equal, and means at least partially responsive to the recombined detected signal portions for varying the frequency of said frequency controlling element.

8. An automatic frequency control system comprising a mixer stage, means for supplying a variable duty cycle frequency modulated signal to said mixer stage, means for supplying locally generated oscillations to said mixer stage, means for deriving an intermediate frequency wave from said mixer stage which is frequency modulated, discriminator means for detecting said intermediate frequency wave, means for dividing the output of said discriminator means into two parts one more positive than the center frequency of said incoming signal and the other more negative than the center frequency of said incoming signal, detecting each of said signal parts to produce direct current voltages proportional to the peak to peak voltages of the respective signal parts, and controlling the center frequency of said intermediate frequency wave in accordance with the voltage difference between said direct current voltages.

References Cited in the file of this patent

UNITED STATES PATENTS

| | | |
|---|---|---|
| 2,261,800 | Freeman | Nov. 4, 1941 |
| 2,266,517 | Rust et al. | Dec. 16, 1941 |
| 2,471,412 | Clark | May 31, 1949 |
| 2,503,105 | Freas | Apr. 4, 1950 |
| 2,558,100 | Rambo | June 26, 1951 |
| 2,560,365 | Norton | July 16, 1951 |
| 2,596,227 | Fernsler | May 13, 1952 |
| 2,654,032 | Staschover | Sept. 29, 1953 |